(12) United States Patent  (10) Patent No.: US 7,412,308 B2
Naimer et al.  (45) Date of Patent: Aug. 12, 2008

(54) DYNAMIC VSI DISPLAY

(75) Inventors: Ted Naimer, Ascona (CH); Sam Hyatt, Alpharetta, GA (US); Jim Brannen, Lawrenceville, GA (US); Tom Lawrence, Knoxville, TN (US)

(73) Assignee: Universal Avionics Systems Corp., Norcross, GA (US)

( * ) Notice: Subject to any disclaimer, the term of this patent is extended or adjusted under 35 U.S.C. 154(b) by 0 days.

(21) Appl. No.: 10/679,975

(22) Filed: Oct. 7, 2003

(65) Prior Publication Data

US 2005/0075762 A1  Apr. 7, 2005

(51) Int. Cl.
*G01C 21/00* (2006.01)
(52) U.S. Cl. .......................... 701/7; 73/179
(58) Field of Classification Search ............... 701/7, 701/3, 14, 18, 200, 301; 73/179; 342/29, 342/455, 46; 340/961, 968, 974, 970, 976, 340/973, 977, 979
See application file for complete search history.

(56) References Cited

U.S. PATENT DOCUMENTS

| | | | |
|---|---|---|---|
| 3,668,622 A | 6/1972 | Gannett et al. ............... 340/27 |
| 4,247,843 A | 1/1981 | Miller et al. ................. 340/27 |
| 4,605,730 A | 8/1986 | Shalaby | |
| 4,700,704 A | 10/1987 | Jamiolowski | |
| 4,750,127 A | 6/1988 | Leslie et al. ............... 364/428 |
| 4,774,670 A | 9/1988 | Palmieri ..................... 364/446 |
| 4,860,007 A * | 8/1989 | Konicke et al. ............. 340/973 |
| 4,914,733 A | 4/1990 | Gralnick ..................... 340/961 |
| 5,133,739 A | 7/1992 | Bezwada | |
| 5,179,377 A | 1/1993 | Hancock ..................... 340/961 |
| 5,185,606 A | 2/1993 | Verbaarschot et al. ....... 340/961 |
| 5,227,786 A | 7/1993 | Hancock ..................... 340/961 |
| 5,248,968 A | 9/1993 | Kelly et al. ................. 340/961 |
| 5,250,947 A | 10/1993 | Worden et al. .............. 340/973 |
| 5,382,954 A | 1/1995 | Kennedy, Jr. et al. ....... 340/961 |
| 5,493,309 A | 2/1996 | Bjornholt .................... 342/455 |
| 5,668,542 A | 9/1997 | Wright ....................... 340/971 |
| 5,739,770 A | 4/1998 | Liden ......................... 340/976 |
| 5,739,771 A * | 4/1998 | Fisher ........................ 340/978 |
| 5,844,504 A * | 12/1998 | Etherington ................ 340/973 |
| 5,872,526 A | 2/1999 | Tognazzini ................. 340/961 |
| 5,920,321 A | 7/1999 | Owen et al. ................. 345/427 |
| 6,085,150 A | 7/2000 | Henry et al. ................ 701/301 |
| 6,154,151 A * | 11/2000 | McElreath et al. .......... 340/970 |
| 6,255,408 B1 | 7/2001 | Shalaby | |
| 6,255,964 B1 * | 7/2001 | Steele, Jr. ................... 340/945 |
| 6,259,378 B1 | 7/2001 | Block ......................... 340/963 |
| 6,271,768 B1 | 8/2001 | Frazier, Jr. et al. .......... 340/961 |
| 6,400,283 B1 | 6/2002 | Berlioz et al. ............... 340/975 |
| 6,473,003 B2 * | 10/2002 | Horvath et al. .............. 340/945 |
| 6,494,898 B1 | 12/2002 | Roby | |
| 6,498,229 B1 | 12/2002 | Shalaby | |
| 6,503,991 B2 | 1/2003 | Shalaby | |
| 6,507,288 B2 | 1/2003 | Block ......................... 340/963 |
| 6,571,155 B2 * | 5/2003 | Carriker et al. ............. 701/3 |
| 6,683,541 B2 * | 1/2004 | Staggs et al. ................ 340/961 |
| 2003/0132860 A1 * | 7/2003 | Feyereisen et al. ......... 340/973 |
| 2004/0113816 A1 * | 6/2004 | Maris ......................... 340/971 |
| 2004/0210355 A1 * | 10/2004 | Gaidelis et al. ............. 701/4 |

* cited by examiner

*Primary Examiner*—Dalena Tran
(74) *Attorney, Agent, or Firm*—Quarles & Brady; George E. Haas

(57) ABSTRACT

A graphical display of a dynamic vertical speed indicator (VSI).

11 Claims, 3 Drawing Sheets

DYNAMIC VSI DISPLAY

BACKGROUND AND SUMMARY OF THE INVENTION

Situational awareness refers to the degree of accuracy by which one's perception of his current environment mirrors reality. With regard to the operation of an aircraft, situational awareness relates to a pilot's perception of what is happening to the aircraft within the four dimensions of space and time. Situational awareness also relates to the pilot's comprehension of a present situation and a projection of the status of the aircraft into the near future.

During the operation of an aircraft, multiple operational parameters and systems must be monitored simultaneously, including the airspeed, attitude, engines, fuel management, navigation indicators, and weather radar. Many of these operational parameters and systems on the aircraft must be supervised by a pilot reacting to subtle changes in the alignment of needles on gauges or of pictorial displays on screens.

The present invention relates to improved displays of aircraft operation data that increase the situational awareness of a pilot and flight crew. The present application claims new displays or presentations of aircraft data. The displays of the present invention employ commercially available systems that may be used without modification to supply the necessary signals to operate the displays of the present invention. The present invention relates to improved displays of aircraft operation data that increase the situational awareness of a pilot and flight crew. More particularly, the displays of the present invention include a vertical speed indicator (VSI) display.

Traffic alert and Collision Avoidance System (TCAS) is a system for detecting and tracking other aircraft approaching the vicinity of a TCAS-equipped aircraft. By continuous interrogation of the transponders of the approaching aircraft, the TCAS system estimates and updates the flight paths of the approaching aircraft relative to the TCAS-equipped aircraft. Through the projection of the approaching flight paths of other planes relative to the position and path of the TCAS-equipped aircraft, the TCAS system will determine if an approaching aircraft is a possible collision hazard. If a collision hazard exists according to TCAS, the system will issue visual and auditory advisories, also known as resolution advisories, to the crew for appropriate vertical avoidance maneuvers.

The present invention includes the display of "fly-to" commands on a vertical speed indicator during a TCAS traffic or resolution advisory condition. The present invention typically includes a representation of an arc or semicircular depiction of a vertical speed indicator scale. The present invention may also comprise a marker, such as a pointer, or a viewing window having a digital numeric display showing the current vertical speed of the TCAS-equipped aircraft. The display of the present invention may also comprise indices or graduations along the arc or semicircle that are representative of typical analog-type displays. For example, a display of the present invention may have a vertical speed scale showing a continuous range of indices matching the typical markings of analog scales such as 0 (zero), +/−500, +/−1000, +/−1500, +/−2000, +/−2500, +/−3000, +/−4000, +/−5000, and +/−6000 feet per minute. It is also possible for examples of the present invention to arrange said indices in a nonlinear fashion around the scale. Also typical of an example of the present invention is the showing of no-fly segments around the periphery of the VSI scale in a red color, and conversely, fly-to segments may be shown in a green color. In addition, examples of the present invention may include other uses of color, particularly the red color as an indicator of no-fly segments and green at fly-to segments, on elements such as the marker, the digital display or other elements in a viewing window, or on the periphery of the VSI scale. It is also possible for examples of the present invention to include a change in size, in particular an enlargement of the VSI display on a typical viewing device, in order to provide additional visual cues to a flight crew in order to indicate determinations of TCAS or resolution advisory flight conditions for an aircraft.

Examples of the present invention may also include representations of fractional sections of a VSI scale. The fractional section may be shown either on a semicircle, as a fixed arc, or along a portion of an ellipse. The particular portion of a VSI scale shown with an example of the present invention would typically present the current vertical speed of an aircraft on the VSI scale bounded equidistant by the range of the values for vertical speed shown on that portion of the VSI scale. This type of display may be provided by linear or nonlinear distributions of the indices for reading along the VSI scale. Conversely, the VSI scale may by bounded on at least one end by an upper limit, such as −6000 or +6000 feet per minute. To assist the flight crew in the readability of the display of the present invention, on the occasion wherein the actual VSI was at or above an upper (or lower) limit or extreme of the VSI scale, the VSI scale may at least provide an additional indicia marking such as the 0 (zero) mark to provide a frame of reference. It is also possible for an indicator such as the vertical speed marker having a numeric display to show actual vertical speed figures beyond the range of the displayed VSI scale, for example +/−9999 feet per minute.

In addition to the features mentioned above, objects and advantages of the present invention will be readily apparent upon a reading of the following description.

BRIEF DESCRIPTION OF THE DRAWINGS

Novel features and advantages of the present invention, in addition to those mentioned above, will become apparent to those skilled in the art from a reading of the following detailed description in conjunction with the accompanying drawings wherein similar reference characters refer to similar parts and in which.

DETAILED DESCRIPTION OF THE EXAMPLE PREFERRED EMBODIMENTS

The example embodiments herein described are not intended to be exhaustive or to limit the invention to the precise forms disclosed. They are chosen and described to explain the principles of the invention and the application of the method to practical uses so that others skilled in the art may practice the invention.

The Primary Flight Display (PFD) utilized in the example embodiments of the present invention is a dynamic, color display of all of the parameters necessary for flight path control. A typical PFD provides data related to an aircraft in flight including heading, airspeed, altitude, attitude, and vertical speed.

Figure 1:
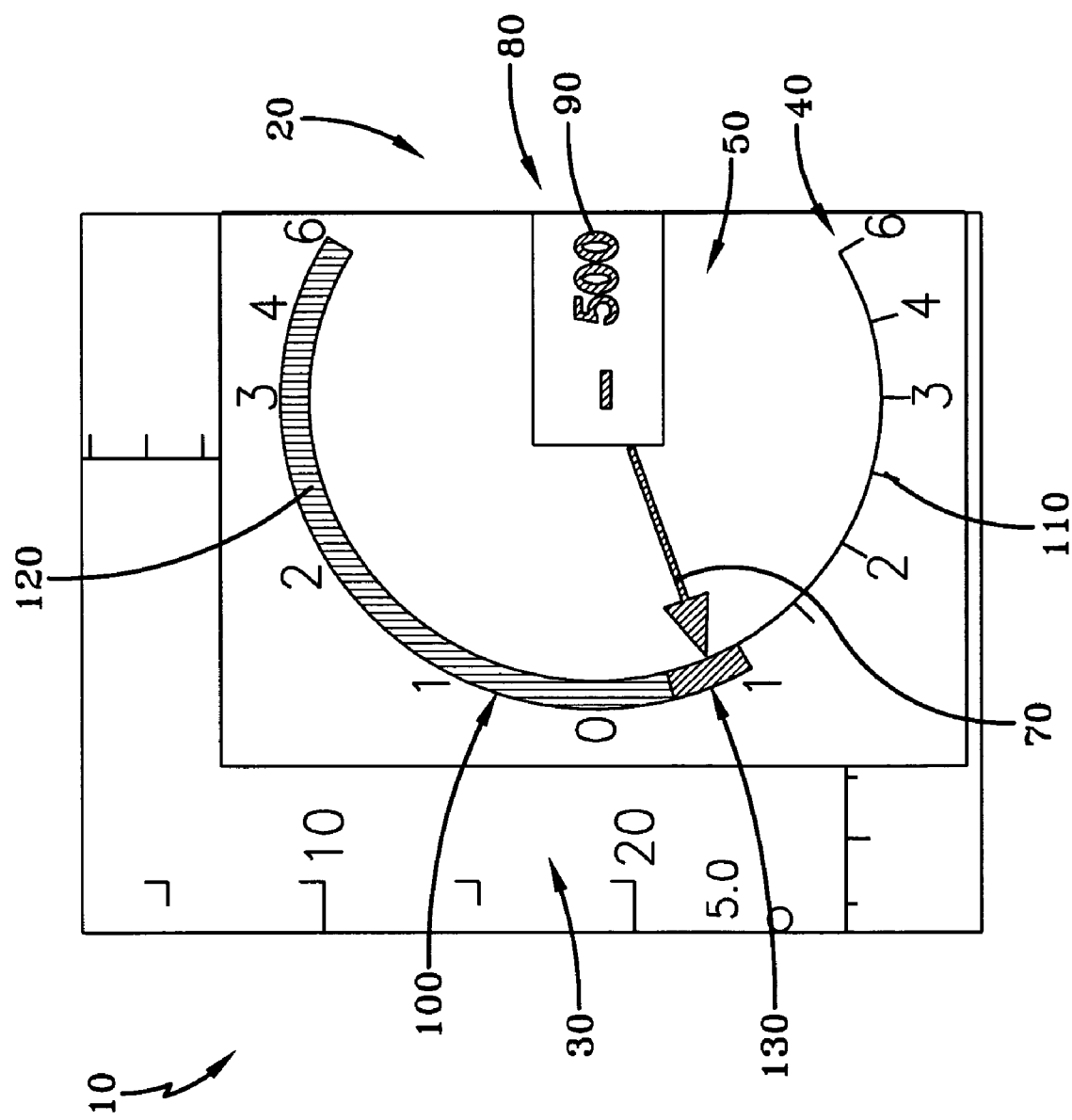
FIG. 1 illustrates example embodiments of the dynamic VSI display of the present invention.
Figure 2:
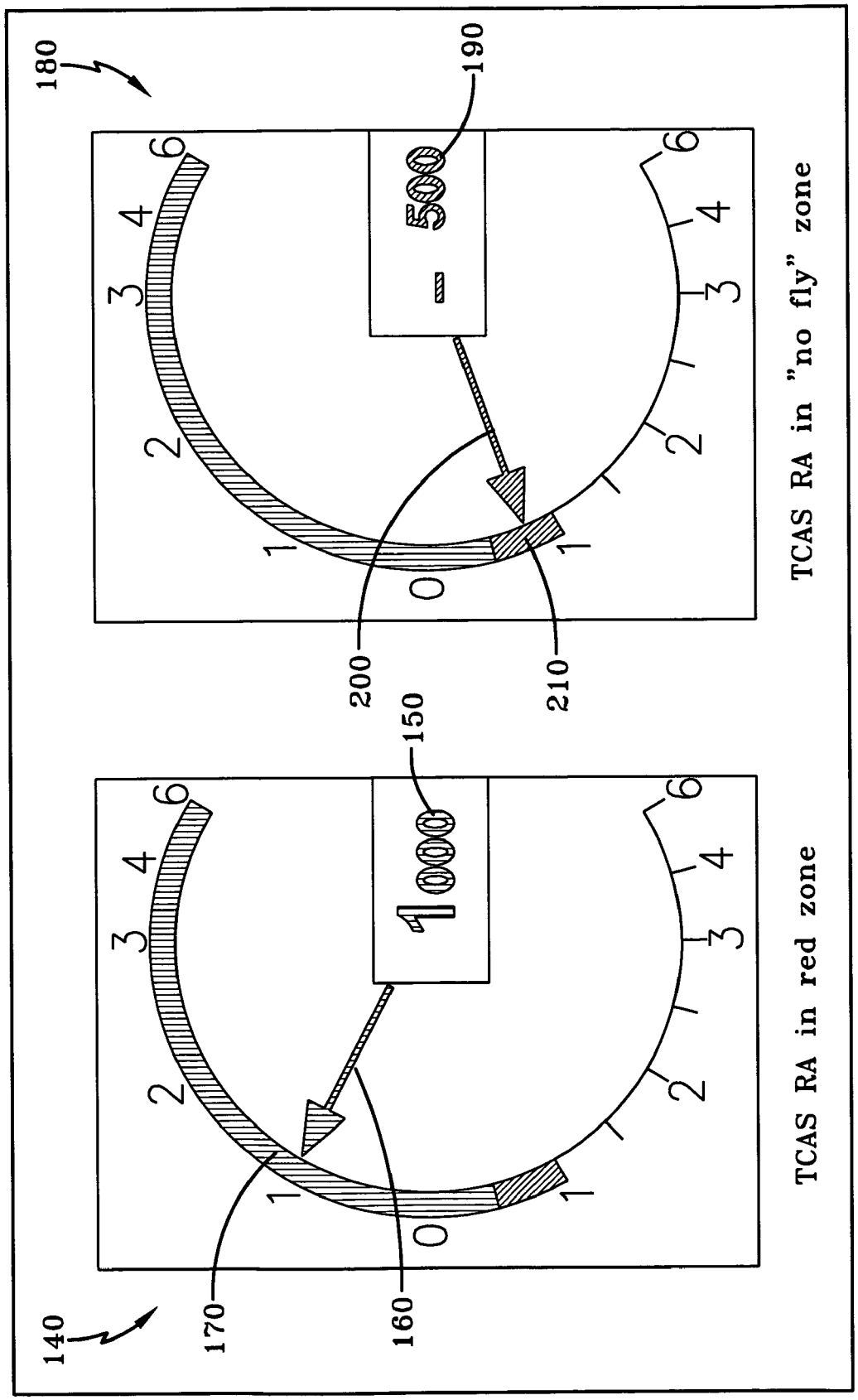
FIG. 2 illustrates an example embodiment of the VSI display of the present invention.
Figure 3:
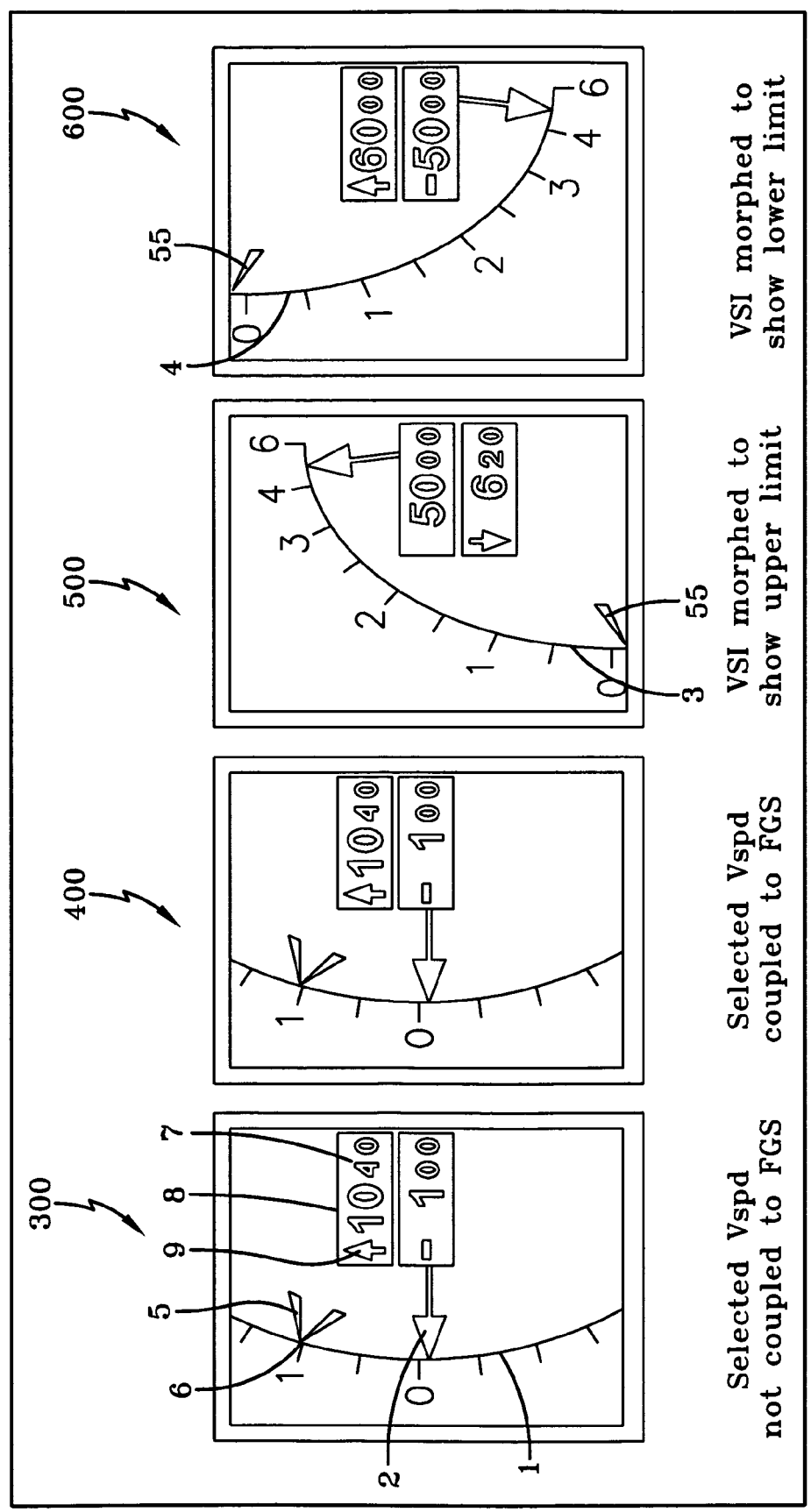
FIG. 3 illustrates example embodiments of VSI displays of the present invention.

As can be noted in FIGS. 1-3 of the example embodiments of the present invention, the object of the present invention is to provide a display of a vertical speed indicator (VSI).

FIG. 1 illustrates an example embodiment of a TCAS VSI display of the present invention. As shown in FIG. 1, a portion of a PFD display 10 is shown with the TCAS VSI display 20 overlying a portion of adjacent depictions of flight information 30. In this example embodiment of the present invention, an enlarged TCAS VSI display 20 overlying a portion of adjacent depictions of flight information 30 during TCAS or resolution advisory flight conditions is to be contrasted with a typical PFD display of a VSI during non-TCAS traffic or resolution advisory flight conditions. The enlarged TCAS VSI display 20 of the present invention allows a flight crew to better view flight instructions that are intended to avoid collisions with approaching aircraft. In contrast, during non-TCAS traffic, the VSI display would typically be sized to a complementary fit on the PFD and provide VSI information to the flight crew.

As shown in FIG. 1, the TCAS VSI display 20 example of the present invention shows a full range depiction of a VSI scale 40 on a contrasting background 50. The VSI scale 40 is shown with graduations 110 along its arc to denote indices for units of measurement of vertical speed. In this example, the full range depiction of the VSI scale 40 is +/−6,000 feet per minute. In other embodiments of the present invention, a full range depiction of a VSI scale can be increased or deceased as desired for the aircraft application. Typical ranges for the scale of vertical speed would be +/−2,000, +/−3,000, and +/−4,000 feet per minute. The range may also be represented in metric measurements and for different time intervals, for example the range of vertical speed scale may shown in units comprising meters (for distance) or seconds (for time).

FIG. 1 also shows an example depiction of a vertical speed marker 70 as an arrow. The vertical speed marker 70 of the present invention shows the current vertical speed of the aircraft on the VSI scale 40. Also shown is an example viewing window 80 displaying a numeric display 90 of the current vertical speed of the aircraft.

Along the periphery of the VSI scale 40 are TCAS resolution advisory indicators 100. The TCAS indicators on the VSI are typically highlighted with a green color to indicate vertical speeds that a pilot is instructed to actively fly-to or maneuver the aircraft to satisfy a resolution advisory and to achieve safe separation from an approaching aircraft. In contrast the TCAS indicators on the VSI are typically highlighted with a red color to indicate vertical speeds that must be avoided as no-fly segments. Although not shown in color on FIG. 1, the example embodiment is shaded to indicate the typical usage of a red arc 120 along at least a portion of the periphery of the VSI scale 40 to indicate a no-fly segment and the typical usage of a green arc 130 along at least a portion of the periphery of the VSI scale 40 to indicate a fly-to segment.

FIG. 2 illustrates example embodiments of the TCAS VSI display of the present invention. As shown at 140, the digital display of vertical speed 150 and pointer 160 are shown in a shading to indicate an example a red-colored display when the current vertical speed of an aircraft is within a no-fly segment 170 of the TCAS resolution advisory indicators. In contrast, as shown at 180, the digital display of vertical speed 190 and pointer 200 are shown in a shading to indicate an example a green-colored display when the current vertical speed of an aircraft is within a fly-to segment 210 of the TCAS resolution advisory indicators.

FIG. 3 at 300 illustrates an example embodiment of a VSI display of the present invention. As shown at 300, a fractional section of a VSI scale I is shown with a vertical speed indicator marker 2, in this example shown as an arrow, showing the current vertical speed of the aircraft on the VSI scale 1. As shown on FIG. 3 from the ranges depicted on the VSI scales at 500 and 600 at 3 and 4, respectively, it is clearly shown that examples of the present invention may display non-linear scales for vertical speed. In addition, the VSI scales at 3 and 4 are shown as being elliptically shaped.

Also shown at 300 is a vertical speed bug 5 that may be activated and displayed on the inside edge of the VSI scale 1. When selected for viewing or adjustment, the speed bug 5 may appear as a chevron pointing at the selected vertical speed as shown at 6. In addition a digital value 7 for the selected vertical speed may appear on the display in a viewing window 8. The digital value 7 may be freely selected or adjusted in stepped values (for example in fifty feet increments). In addition, an up or down arrow may appear as the first character 9 in the viewing window 8 to provide a visual cue for selecting a vertical speed value. In an example embodiment, the viewing window 8 containing the digital value 7 and the speed bug 5 may be visible only while the bug is being set and for a few seconds after it has stopped changing. The window 8, digital value 7, and the speed bug 5 may then be removed to declutter the information shown on the display. In the event that the vertical speed bug 5 would be outside of the range of values displayed on the VSI scale 1, half of the speed bug 55, as shown at 500 or at 600, is parked on the VSI scale 1 at the edge of the display limit. The speed bug 55 would resume its normal shape (i.e., as shown at 5) and position when it may be displayed within the range of the display of the VSI scale 1.

Having shown and described example embodiments of the present invention, those skilled in the art will realize that many variations and modifications may be made to affect the described invention and still be within the scope of the claimed invention. Thus, many of the elements indicated above may be altered or replaced by different elements which will provide the same result and fall within the spirit of the claimed invention. It is the intention, therefore, to limit the invention only as indicated by the scope of the claims.

We claim:

1. An electronic display for presenting data from a vertical speed source aboard an aircraft, wherein said display comprises:
   an arcuate vertical speed indicator scale;
   a vertical speed indicator marker;
   wherein said arcuate vertical speed indicator scale has non-linear graduations marked thereon in the vicinity of said vertical speed indicator marker; and
   TCAS resolution advisory indicators along a periphery of said vertical speed indicator scale wherein said TCAS resolution advisory indicators are shown during a TCAS resolution advisory condition, wherein said TCAS resolution advisory condition triggers enlargement of only a fractional section of the arcuate vertical speed indicator scale, and wherein an attribute of said vertical speed indicator marker changes to match an attribute of said TCAS resolution advisory indicators during the advisory condition.

2. The display according to claim 1 wherein the attribute of said vertical speed indicator marker is a color.

3. The display of claim 1 wherein said fractional section of a vertical speed indicator scale shown by said electronic display changes in shape in response to changes in the vertical speed depicted by said vertical speed indicator marker.

4. An electronic display for presenting data from a vertical speed source aboard an aircraft, wherein said display comprises:
   a curved vertical speed indicator scale;
   a vertical speed indicator marker comprising a pointer and a digital numeric display, showing a vertical speed of the aircraft as indicated by the vertical speed source, wherein said vertical speed indicator scale shows non-linear graduations marked thereon in the vicinity of said vertical speed indicator marker, wherein said vertical speed indicator scale shown by said electronic display changes shape in response to changes in the vertical speed depicted by said vertical speed indicator marker; and TCAS resolution advisory indicators along a periphery of said vertical speed indicator scale shown during a TCAS resolution advisory condition wherein said TCAS resolution advisory condition triggers an increase in size of said electronic display and changes an attribute of the vertical speed indicator marker to visually correspond to an attribute of the TCAS resolution advisory indicators during the advisory condition.

5. The display of claim 4 wherein the attribute of the vertical speed indicator marker is a color.

6. The display of claim 4 wherein said TCAS resolution advisory condition triggers enlargement of only a fractional section of the vertical speed indicator scale.

7. An electronic display for presenting data from a vertical speed source aboard an aircraft, wherein said display comprises:

a curved vertical speed indicator scale;

a vertical speed indicator marker comprising a pointer and a digital numeric display, showing a vertical speed of the aircraft as indicated by the vertical speed source, wherein said curved vertical speed indicator scale shows non-linear graduations marked thereon in the vicinity of said vertical speed indicator marker, wherein said curved vertical speed indicator scale shown by said electronic display changes shape in response to changes in the vertical speed depicted by said vertical speed indicator marker; and TCAS resolution advisory indicators along a periphery of said vertical speed indicator scale that are shown during a TCAS resolution advisory condition.

8. The display of claim 7 wherein the TCAS resolution advisory condition triggers enlargement of only a fractional section of the curved vertical speed indicator scale.

9. The display of claim 7 wherein the TCAS resolution advisory condition triggers a change of a first attribute of the vertical speed indicator marker to visually correspond to a second attribute of the TCAS resolution advisory indicators during the advisory condition.

10. The display according to claim 9 wherein the first attribute and the second attribute are color.

11. The display of claim 7 wherein the TCAS resolution advisory condition triggers enlargement of only a fractional section of an curved vertical speed indicator scale; and wherein an attribute of said vertical speed indicator marker changes to match an attribute of said TCAS resolution advisory indicators during the advisory condition.

* * * * *